United States Patent [19]

Nakazawa

[11] Patent Number: 5,340,982

[45] Date of Patent: Aug. 23, 1994

[54] SYMBOL READING DEVICE FOR VARYING THE FOCAL POINT OF A SCANNING LASER BEAM THROUGH VARIANCE OF SCANNING LASER BEAM OPTICAL PATH LENGTH

[75] Inventor: Atsushi Nakazawa, Osaka, Japan

[73] Assignee: Sumitomo Electric Industries, Ltd., Osaka, Japan

[21] Appl. No.: 34,164

[22] Filed: Mar. 19, 1993

Related U.S. Application Data

[63] Continuation of Ser. No. 884,140, May 18, 1992, abandoned.

[51] Int. Cl.$^5$ .............................................. G06K 7/10
[52] U.S. Cl. .................................. 250/235; 235/467; 359/218
[58] Field of Search ............... 250/566, 234, 235, 236; 358/206; 235/467; 359/216, 217, 218, 219

[56] References Cited

U.S. PATENT DOCUMENTS

4,101,193  7/1978  Waterworth et al. ............... 359/217

FOREIGN PATENT DOCUMENTS

0276589  8/1988  European Pat. Off. .
0444958  9/1991  European Pat. Off. .
59-038721  3/1984  Japan ............................ 359/218
1304589  12/1989  Japan .
27182  1/1990  Japan .
2133891  5/1990  Japan .

OTHER PUBLICATIONS

Patent Abstracts of Japan, vol. 8, No. 137 (p. 282) 26 Jun. 1984.

*Primary Examiner*—David C. Nelms
*Assistant Examiner*—K. Shami
*Attorney, Agent, or Firm*—Cushman, Darby & Cushman

[57] ABSTRACT

In a symbol reading device, at least two laser beams having different optical path lengths, and, therefore, different focal positions are used to scan a symbol surface. The two laser beams are produced from a single beam issuing unit, and only one beam at a time scans the symbol surface. Furthermore, stationary reflecting mirrors are used to create the two laser beams of different focal length, reducing the number of moving mechanisms and the overall complexity of the device.

8 Claims, 5 Drawing Sheets

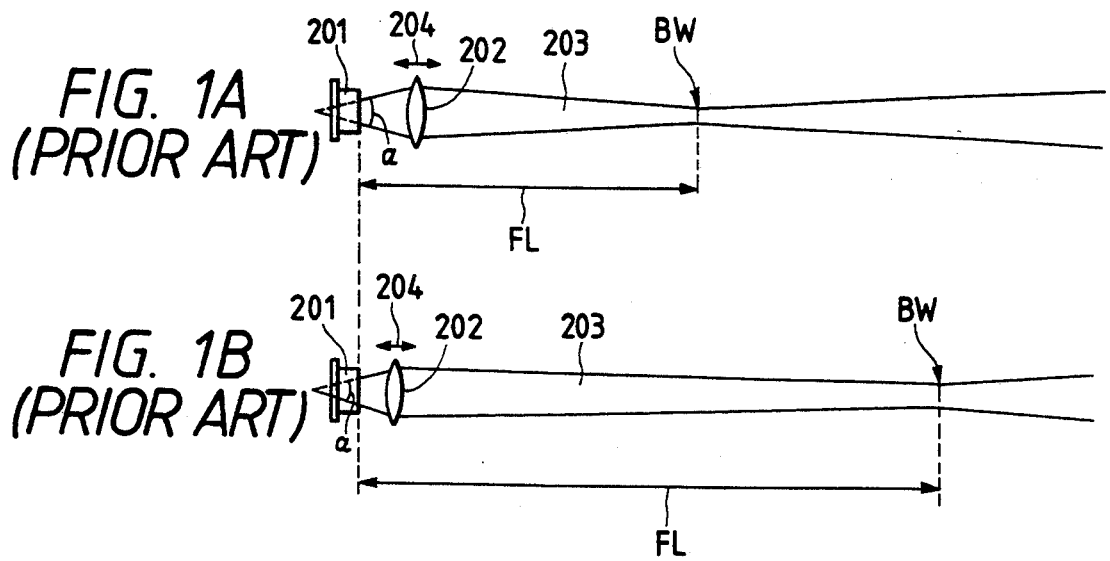
FIG. 1A (PRIOR ART)
FIG. 1B (PRIOR ART)
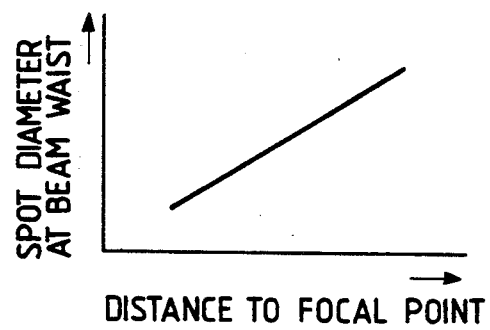
FIG. 2 (PRIOR ART)
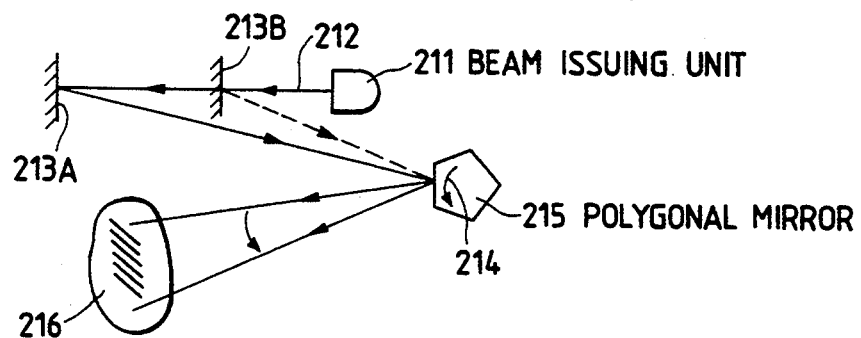
FIG. 3 (PRIOR ART)

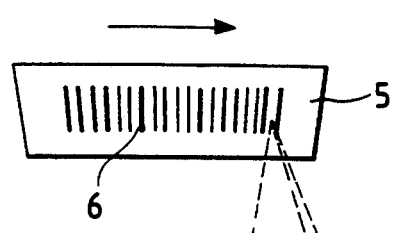
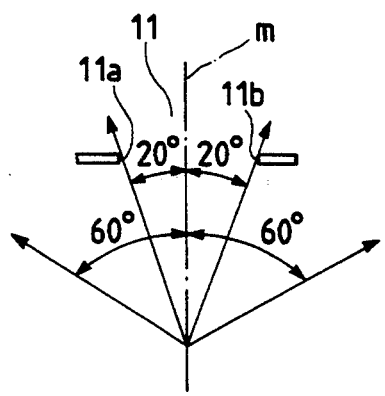
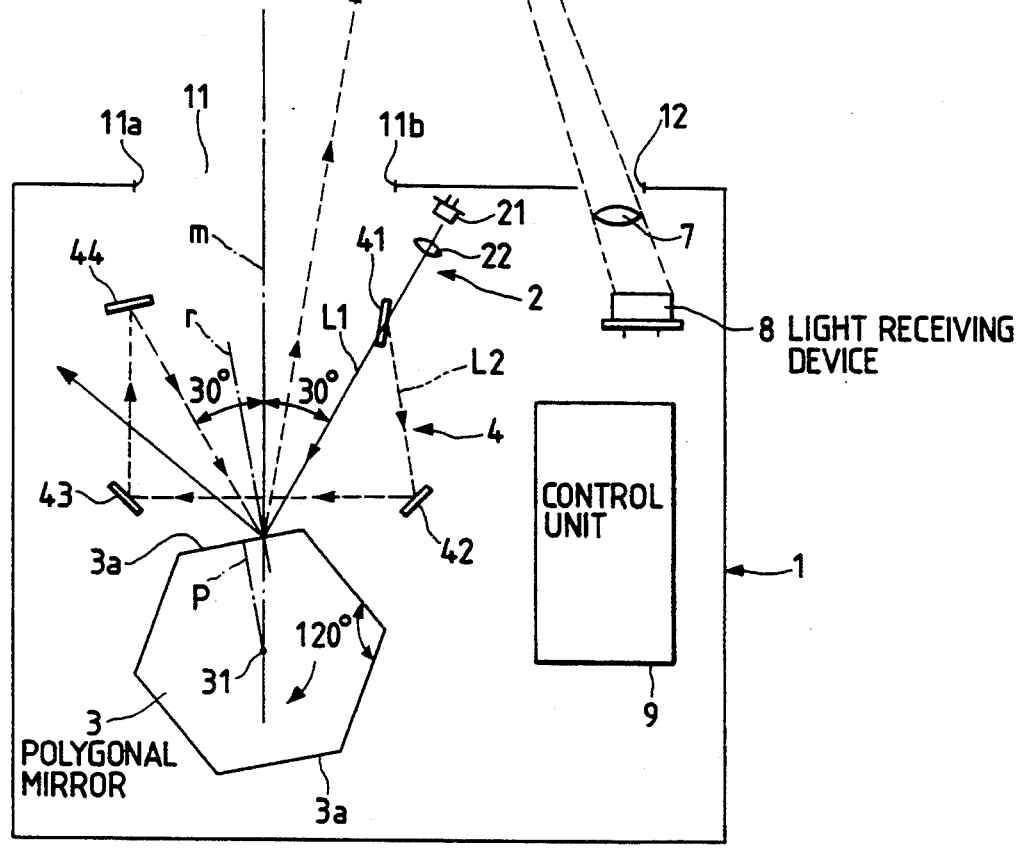

FIG. 8
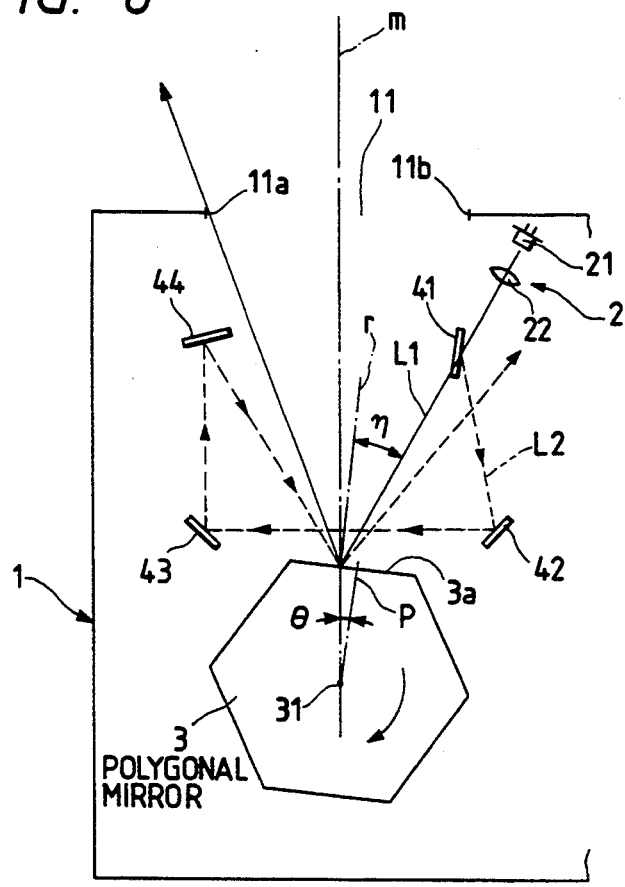
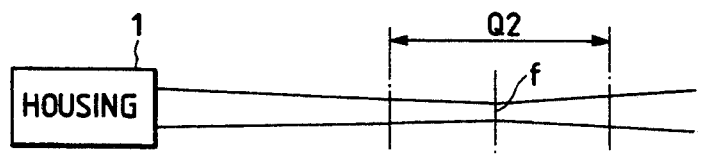
FIG. 9A
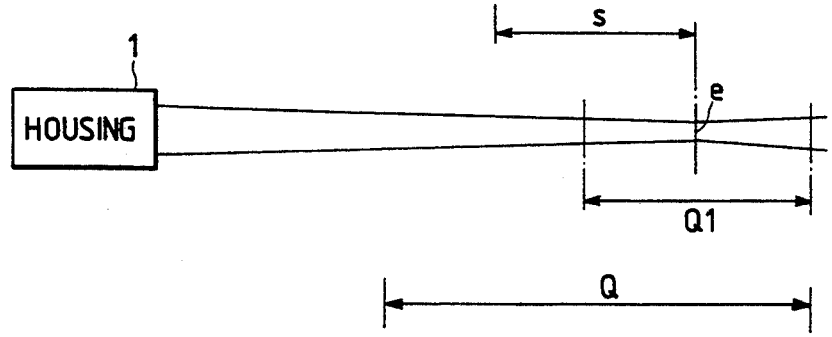
FIG. 9B

SYMBOL READING DEVICE FOR VARYING THE FOCAL POINT OF A SCANNING LASER BEAM THROUGH VARIANCE OF SCANNING LASER BEAM OPTICAL PATH LENGTH

This is a continuation of application Ser. No. 07/884,140, filed on May 18, 1992, which was abandoned upon the filing hereof.

BACKGROUND OF THE INVENTION

1. Field of the Invention

The present invention relates to a symbol reading device such as a bar code reader or an optical character reader (OCR) which optically reads bar codes, characters and other symbols formed on the surface of various objects.

2. Description of the Related Art

Because of their ability to read characters and symbols on the surface of various objects without actual physical contact with those objects, bar code and optical character readers are enjoying extensive use. These symbol reading devices are used as both stationary and hand held symbol readers. It is desirable that the distance between a symbol or bar code carrying surface and the symbol reading device over which symbols or bar codes can be read (i.e., the reading distance) have a fairly broad range as defined by upper and lower limits (i.e., the reading range).

Conventional symbol reading devices scan symbols such as bar codes using a laser beam and receive reflected light from the symbol faces with a light receiving device. An output of the light receiving device represents the intensity of the reflected light. For example, a bar code consisting of black bars and white spaces will reflect light which causes the light receiving device to produce a small signal for bars and a large signal for spaces. Therefore, after suitable processing (i.e., amplification), the output of the light receiving device may be discriminated with reference to a proper slice level, thereby producing a binary signal in association with the scanned bar code. The symbol reading apparatus then identifies the scanned bar code based on the binary signal.

An He-Ne laser has commonly been used as a light source for generating a laser beam, but in recent symbol reading devices, the use of a semi-conductor laser has increased with a view to reducing the overall size and weight of the symbol reading device. However, laser light issuing from a semi-conductor laser is diffusive and usually requires focusing with a lens to produce the nearly parallel rays of a laser beam. Because a bar width of 0.2 mm and less is by no means rare in bar codes, the scanning laser beam must be focused to a spot diameter of 0.2 mm and less in order to enable identification of such small bar widths. Due to these circumstances, semiconductor laser beams are not completely collimated, but are convergent with a focal point at a specific distance.

High resolution symbol reading is possible near focal points since the diameter of the beam spot is quite small. However, at positions remote from the focal point only low resolution symbol reading can be achieved. Thus, conventional symbol reading devices employing a semiconductive laser have unacceptably narrow reading ranges.

A first prior art technique directed to this problem is described in Unexamined Published Japanese Patent Applications No. 304589/1989 and No. 7182/1990. These documents propose the expansion of the reading range by mechanically moving the laser beam light source, lenses and other optical components to vary the optical path length of a scanning laser beam. Thus, the distance between the symbol reading device and the focal point location is variable.

The basic layout of the device disclosed in Unexamined Published Japanese Patent Application No. 7182/1990 is shown in FIGS. 1A and 1B. As shown, the light from a semi-conductor laser light source 201 is condensed by a condensing lens 202 to form a laser beam 203. The laser beam 203 has a beam waist BW in the focal position at distance FL which is determined by the relative positions of the semiconductor laser light source 201 and the condenser lens 202. If a symbol such as a bar code is read out at the position of the beam waist BW, reading with maximum resolution can be accomplished.

In the technique depicted in FIGS. 1A and 1B, the condenser lens 202 is displaceable in direction 204 along an optical axis of laser beam 203; wherein the distance FL from the semiconductor laser light source 1 to the focal position, beam waist BW, can be shortened. Since the position of beam waist BW can be varied, symbols can be read with high resolution over a broad range of reading distances.

The complexity of the structural mechanisms necessary to perform the mechanical movement of the laser light source, lenses and other optical components in this first technique causes an increase in manufacturing cost. Additionally, the increase in the number of moving parts leads to lower reliability. Specifically, with reference to the device shown in FIGS. 1A and 1B, when the condenser lens 202 is brought close to semi-conductor laser light source 1 as shown in FIG. 1B, the angle $\alpha$ subtended at a semiconductor light source 1 by the condenser lens 202 will increase. This increase causes the spot diameter at beam waist BW to also increase. In other words, shown in FIG. 2, the spot diameter at the beam waist BW increases in substantial proportion to the distance FL. As a result, symbols which are a remote distance from the symbol reading apparatus cannot be read with high resolution.

A second prior art technique that also successfully solved the aforementioned problem is described in Unexamined Published Japanese Patent Application No. 133891/1990. The apparatus incorporating this prior art technique has a plurality of beam issuing units. Each beam issuing unit is composed of a semiconductor laser and a lens, and are set to have focal points at different reading distances. The beam issuing units are selectively operated in accordance with a particular reading distance or a selected reading distance so that symbols can be read with high resolution over a broad reading range.

This second prior art technique involves the use of multiple semiconductor laser light sources and lenses which causes the cost of the symbol reading apparatus to increase. Additionally, there is the problem that a complicated optical layout is required to achieve registry among the optical paths of the laser beams issued from the plurality of beam issuing units.

A third prior art technique that has successfully solved the aforementioned problem is shown schematically in FIG. 3. In FIG. 3, a beam issuing unit 211 emits a laser beam 212, which has its optical path switched back by a reflector mirror 213A or 213B. The reflected laser beam 212 is again reflected by a polygonal mirror 215. Polygonal mirror 215 is rotated at a constant speed in the direction of arrow 214, and guides laser beam 212 towards a symbol face 216 carrying a bar code to be read. As the polygonal mirror 215 rotates, the direction in which the laser beam 212 travels will change, scanning the symbol face 216 automatically.

The reflector mirror 213B, which is closer to the beam issuing unit 211, is inserted into or retracted from the optical path of laser beam 212 by a drive mechanism (not shown). When inserted, the laser beam 212 is reflected by the mirror 213B, and when retracted laser beam 212 is reflected by mirror 213A. As a result, the optical path length of laser beam 212 is changed, and the distance from the symbol reading device to the focal position where the beam waist of the laser beam is formed, can be varied between two values. Possible modifications include the addition of reflector mirrors between beam issuing unit 211 and reflector mirror 213A. Alternatively, a single mirror can be displaced between reflector mirror 213A and the position of reflector mirror 213B. This symbol reading device permits the beam waist of the laser beam to be formed at varying positions thereby accomplishing high resolution reading of symbols at various distances from the symbol reading device.

The problem with the third prior art technique is that a driving mechanism is required for driving each reflector mirror positioned between beam issuing unit 211 and the reflector mirror 213A. As a result, the number of moving parts increases as the reading range of the symbol reading device increases which causes both an increase in cost and a decrease in reliability. In the modified symbol reading device using a single reflector mirror displaced continuously along the optical path of laser beam 212 between the beam issuing unit 211 and reflector mirror 213A, the long operating distance of the single reflector mirror impairs response of the system.

SUMMARY OF THE INVENTION

An objective of the present invention is to provide a symbol reading device with a broad reading range which has simple structure, high reliability, and low manufacturing costs.

In a first embodiment of the present invention, at least two laser beams having different optical path lengths; and, therefore, different focal positions are used to scan a symbol surface. The two laser beams are produced from a single beam issuing unit, and only one beam at a time scans the symbol surface. Furthermore, stationary reflecting mirrors are used to create the two laser beams of different focal length, reducing the number of moving mechanisms and the overall complexity of the device.

Specifically, the symbol reading device of this embodiment has a housing with an aperture; laser beam issuing unit for emitting a reading laser beam; a scanning device (generally a polygonal mirror) for scanning a laser beam through a range of angles wider than those encompassing the aperture; optical components disposed between the laser beam issuing unit and the scanning device for splitting the reading laser beam into at least a first and second laser beam having first and second optical paths, respectively, the first and second laser beams incident on the scanning device from different directions to prevent simultaneous emergence of the first and second laser beams through the aperture, the first and second optical paths having different lengths as measured from the laser beam issuing unit to the scanning device; light receiving device for receiving a laser beam which has emerged through the aperture and been reflected off of a target surface; and, a processing unit for identifying symbols on the target surface based on output from the light receiving device.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

FIGS. 1A and 1B show the basic layout of a prior art symbol reading device.

FIG. 2 shows the relationship between the distance to the focal point of a laser beam and the spot diameter of the beam waist of the laser beam, as observed with the symbol reading device of FIGS. 1A and 1B.

FIG. 3 is a schematic diagram of a prior art symbol reading device.

FIG. 4 is a plan view showing the basic layout of a bar code reader which is an embodiment of the symbol reading device of the present invention.

FIG. 5 is a diagram showing schematically the relationship between the scanning angle and the width of the aperture in the housing.

FIGS. 6–8 are plan views schematically showing the sequence of operations of the bar code reader shown in FIG. 4.

FIGS. 9A and 9B show the focal positions of laser beams in two different optical paths.

DETAILED DESCRIPTION OF THE PREFERRED EMBODIMENTS

Figure 6:
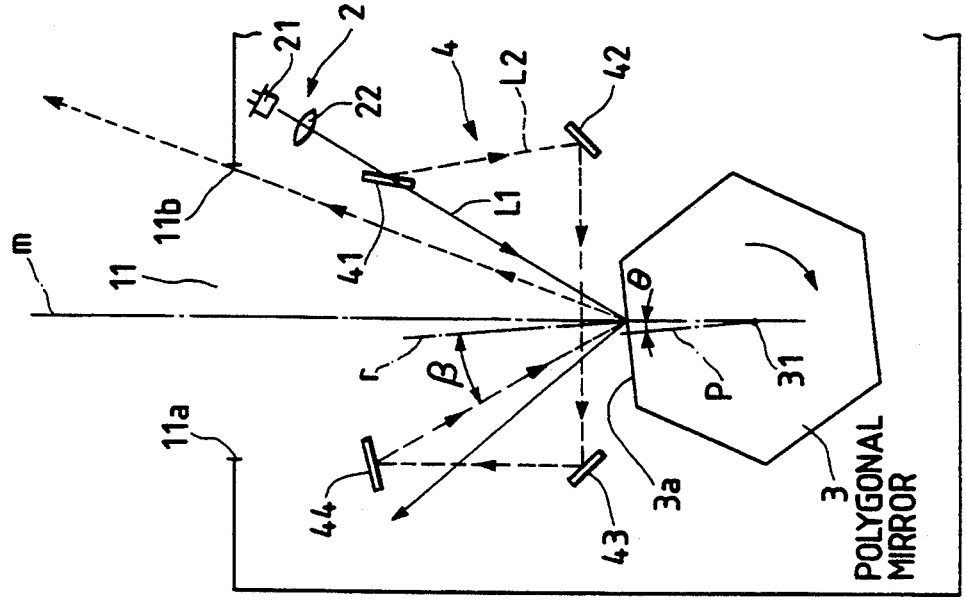

Several embodiments of the present invention are described below with reference to the accompanying drawings.

FIG. 4 is a plan view showing the basic layout of a bar code reader which is an embodiment of the symbol reading device of the present invention. With reference to FIG. 4, the bar code reader comprises a housing 1 that has an aperture 11, and a laser beam issuing unit 2 that issues semiconductor laser light and is accommodated in the housing 1, a polygonal mirror 3 that provides a rotary laser beam scanning device for scanning a target symbol surface, and an optical unit 4 interposed between the laser beam issuing unit 2 and the polygonal mirror 3 for splitting the laser beam from the laser beam issuing unit 2 into a first and second laser beam having a first and second optical path, L1 and L2, respectively. The optical unit 4 guides the first and second laser beams so that they are incident on the polygonal mirror 3 via different optical path lengths and different directions.

The housing 1 also accommodates a motor (not shown) for rotating the polygonal mirror 3 clockwise as shown by the arrow in FIG. 4; a condenser lens 7 for condensing light reflected by code carrying surface 5 which passes through light-receiving aperture 12; a light-receiving device 8 such as a photodiode that receives the reflected light condensed by the condenser lens 7; and a control unit 9 that performs a waveform shaping and binarizing operation on an output signal from the light-receiving device 8 to obtain a binary signal corresponding to the code carrying surface 5, and that identifies the contents of a bar code 6 on the basis of that signal.

The housing 1 may be formed of a metal or a resin. The housing 1 may be either a fixed or a hand-held type.

Aperture 11 is provided for permitting laser beams to emerge out of the housing 1. The aperture 11 may be in a grid pattern for restricting the emergence of laser beams out of the housing 1. The aperture 11 only needs to allow the emergence of laser beams; therefore, the aperture 11 may be covered with glass or a filter that attenuates the transmission of light at wavelengths other than that of desired laser beams.

The polygonal mirror 3 has six reflecting faces 3a on its periphery that extend parallel to the longitudinal axis of rotation 31. The reflecting faces 3a are equidistant from the longitudinal axis of rotation 31 and any two adjacent reflecting faces 3a form an angle of 120°. Hence, a laser beam incident on the polygonal mirror 3 is scanned 120° as the polygonal mirror 3 rotates. More specifically, with reference to FIGS. 4 and 5, an incident laser beam is scanned through 60° to both the left and right symmetrically with respect to a centerline m connecting the center of the aperture 11 and the longitudinal axis of rotation 31.

The distance between the aperture 11 and the polygonal mirror 3 and the width of the aperture 11 are set so that a laser beam emerging through the aperture 11 will spread through angles that assume the central 40° range o the above-defined scanning angle of 120°. More specifically, with reference to FIG. 5, the emerging laser beam emerges through the aperture 11 over the angular range of 20° to both the left and right symmetrically with respect to the centerline m.

The laser beam issuing unit 2 comprises a laser beam oscillating device 21 that outputs semiconductor laser light or helium-neon laser light, a lens 22 that converges the output laser light from the laser beam oscillating device 21, and a diaphragm stop (not shown). The settings of the lens 22 and the diaphragm stop are such that the spot diameter of the laser beam will be the smallest at a predetermined distance (typically ca. 200–300 mm) from the bar code reader.

The optical unit 4 comprises mirrors 41, 42, 43 and 44. Mirror 41 is a half-mirror by which the laser beam from the laser beam issuing unit 2 is split into the first and second laser beams having optical path L1 (as indicated by a solid line in FIGS. 4 and 6–8) and an optical path L2 (as indicated by a dashed line in FIGS. 4 and 6–8, respectively). The other mirrors 42, 43 and 44 are disposed sequentially in the optical path L2.

Optical path L1 is such that the first laser beam is incident on the polygonal mirror 3 through the half-mirror 41 in a direction that forms an angle of 30° to the right with respect to the centerline m as viewed in FIG. 4. Optical path L2 is such that the second laser beam is incident on the polygonal mirror 3 via the mirrors 41–44 in a direction that forms an angle of 30° to the left with respect to the centerline m as viewed in FIG. 4 (i.e., symmetrical to optical path L1 with respect to the centerline m).

The operation of the bar code reader under discussion is described below with reference to FIGS. 4, 6 and 7.

FIG. 6 shows the case where the reflecting face 3a of the polygonal mirror 3 is inclined so that the line p, normal to the reflecting face 3a which passes through the longitudinal axis of rotation 31, forms of an angle $\theta$ of $-25°$ with respect to the centerline m, the minus sign indicating a direction reverse to the direction of the rotation of the polygonal mirror 3 (whereas an angle, etc. in the polygonal mirror 3 the direction of rotation is indicated by a plus sign). In FIG. 6 the second laser beam travelling in the optical path L2 is incident on the reflecting face 3a at an angle $\beta$ of $-5°$ with respect to the line r normal to reflecting face 3a and, hence, will be reflected at the same angle of $+5°$ with respect to the normal r. In other words, the second laser beam will be reflected from the polygonal mirror 3 at an angle of $-20°$ with respect to the centerline m, and will emerge out of the housing 1 through the aperture 11 at left end 11a to reach the code carrying face 5. Also in FIG. 6, the first laser beam travelling in the optical path L1 is incident on the reflecting face 3a at an angle of 55° with respect to the normal r and, hence, will be reflected at an angle of $-80°$ with respect to the centerline m and not emerge out of the housing 1.

As the polygonal mirror 3 shown in FIG. 6 rotates clockwise, the second laser beam in the optical path L2 is scanned across the aperture 11 from the left end 11a towards the right end 11b. As the polygonal mirror 3 further rotates, it passes through the stage shown in FIG. 7, and then the angle $\theta$ that normal p forms with the centerline m becomes $-5°$ as shown in FIG. 7. With $\theta$ equal to $-5°$, the angle $\beta$ becomes $-25°$, causing the second laser beam in the optical path L2 to emerge out of the housing 1 through the aperture 11 in the neighborhood of the right end 11b. The first laser beam in the optical path L1 is reflected at an angle of $-40°$ with respect to the centerline m and will not emerge out of the housing 1.

Figure 7:
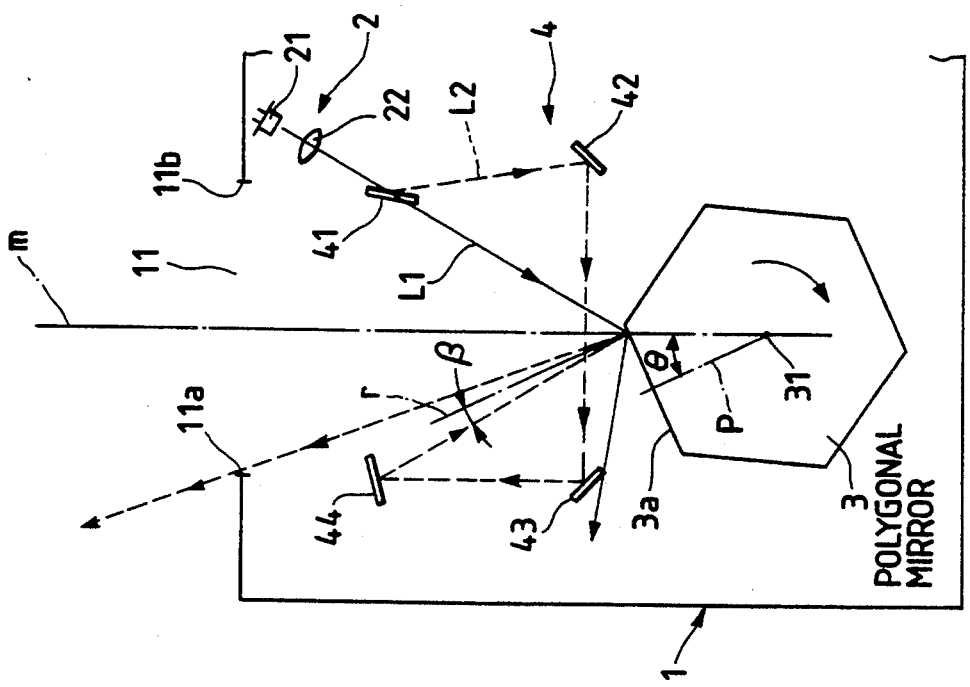

As the polygonal mirror 3 shown in FIG. 7 further rotates, the second laser beam in the optical path L2 will no longer emerge out of the housing 1 through the aperture 11. When the polygonal mirror 3 rotates so that the angle $\theta$ that normal p forms with the centerline m becomes $+10°$, as shown in FIG. 8, the first laser beam in the optical path L1 will be incident on the reflecting face 3a at an angle n of $+25°$ with respect to the normal r. The reflected first laser beam will emerge out of the housing 1 through the aperture 11 in the neighborhood of the left end 11a. As the polygonal mirror 3 further rotates, the first laser beam will be scanned towards the right end 11b of the aperture 11.

The above-described procedure is repeated for each of the reflecting faces 3a on the rotating polygonal mirror 3. It should be noted here that the optical path length from the laser beam issuing unit 2 to the polygonal mirror 3 differs between optical paths L1 and L2. The different optical path lengths occur within the housing 1 and, hence, the distance between the focal point e of the first laser beam in the optical path L1 and the housing 1 will differ from the distance between the focal point f of the second laser beam in the optical path L2 and the housing 1 as shown in FIGS. 9A and 9B. Stated more specifically, the focal point e for the case shown in FIG. 9B, which is associated with the optical path L1, is more remote from the housing 1 than the focal point f for the case shown in FIG. 9A, which is associated with the optical path L2. Since the overall reading range Q of the bar code reader is the sum of the reading range Q1 provided by the first laser beam in the optical path L1 and the reading range Q2 provided by the second laser beam in the optical path L2, the symbol reading apparatus of the present invention will have a broad reading range. It should also be noted that the distance s between the focal positions e and f corresponds to the optical path length difference between the two optical paths L1 and L2.

As described on the foregoing pages, the first and second laser beams in the respective optical paths L1 and L2 as split by the optical unit 4 are made to differ in optical path length, so that they can be focused at different positions in the direction of the depth of reading. Thus, the region that can be scanned with a small beam spot is increased to provide a broader reading range. In addition, the length of optical paths L1 and L2 are hanged by the optical unit 4, and not by any mechanical movement of a laser beam issuing unit and/or a laser beam scanning device. This obviates the need to provide mechanical structure for moving a laser beam issuing unit and scanning device relative to each other. As a result, the overall construction of the reading apparatus is simplified, improving the reliability of the symbol reading device and reducing its manufacturing cost.

If desired, the optical unit 4 may include two or more half-mirrors so as to split the laser beam into three or more laser beams having different length optical paths. It is also possible to adopt other structures such as one that uses a prism mechanism as an optical unit.

Figure 10A:
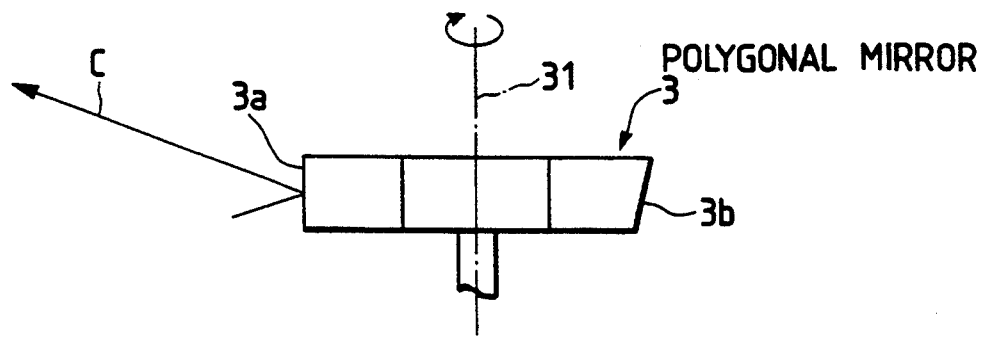
FIGS. 10A and 10B are side views of a polygonal mirror for modifying the embodiments of the present invention.
Figure 10B:
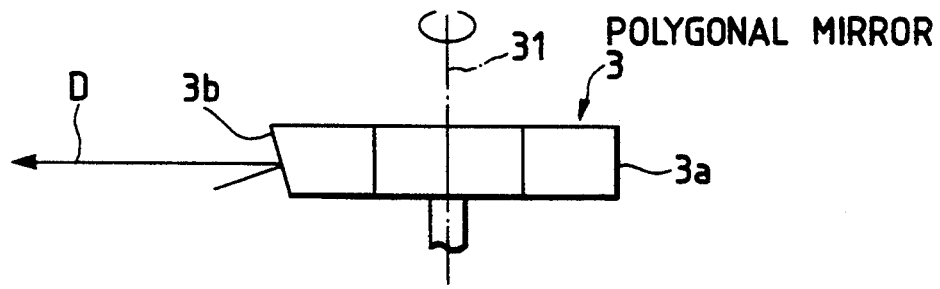
Figure 11:
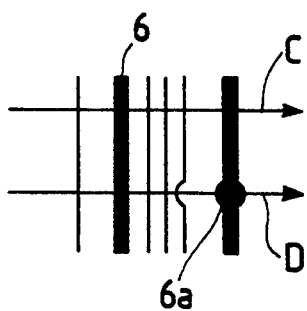
FIG. 11 is a diagram showing how a bar code is scanned with laser beams reflected from the polygonal mirror of FIGS. 10A and 10B.

For example, in FIGS. 10A and 10B, the polygonal mirror 3 is provided with at least two reflecting faces 3a and 3b that are inclined at different angles with respect to the longitudinal axis of rotation 31. Therefore, a laser beam is scanned in two parallel directions C and D. An advantage of this embodiment is that if the bar code 6 contains an illegible portion 6a, due to a smudge that occurred during printing (see FIG. 11), reading performance can be improved because one of the scanning directions C and D is generally scanned over the legible areas.

The foregoing embodiments assume that the symbol reading device of the present invention is applied to a bar code reader. It should be noted that the present invention is also applicable to other optical symbol readers such as an optical character reader.

While the invention has been described in connection with what is presently considered the most practical and preferred embodiments, it is to be understood that the invention is not limited to the disclosed embodiments; but, on the contrary, is intended to cover various modifications and equivalent arrangements included within the spirit and scope of the appended claims.

I claim:

1. A symbol reading device for reading symbols on a target surface comprising:
   a housing having an aperture;
   a laser beam issuing means for emitting a reading laser beam;
   scanning means for scanning a laser beam through a range of angles wider than those encompassing said aperture;
   optical means disposed between said laser beam issuing means and said scanning means, said optical means including a single lens means for converging said reading laser beam, and a splitting means for splitting said converged reading laser beam into at least a first and second laser beam having first and second optical paths respectively, said first and second laser beams being incident on said scanning means from different directions to prevent simultaneous emergence of said first and second laser beams through said aperture, said first and second optical paths having first and second lengths, respectively, as measured from said laser beam issuing means to said scanning means, said first length differing from said second length by a distance sufficient to cause said first laser beam to have a first focal length different from a second focal length of said second laser beam;
   light receiving means for receiving a laser beam which has emerged through said aperture and been reflected off of said target surface; and
   processing means for identifying symbols on said target surface based on output from said light receiving means.

2. A symbol reading device which has a housing with an aperture, a laser beam issuing means for emitting a reading laser beam which emerges through said aperture, a light receiving means for receiving a laser beam which has emerged through said aperture and been reflected off of a target surface, and a processing means for identifying symbols on said target surface based on output from said light receiving means for reading symbols on said target surface, said symbol reading device comprising;
   scanning means for scanning a laser beam through a range of angles wider than those encompassing said aperture; and
   optical means disposed between said laser beam issuing means and said scanning means, said optical means including a singles lens means for converging said reading laser beam, and a splitting means for splitting said converged reading laser beam into at least a first and second laser beams having first and second optical paths, respectively, said first and second laser beams being incident on said scanning means from different directions to prevent simultaneous emergence of said first and second laser beams through said aperture, said first and second optical paths having first and second lengths, respectively, as measured from said laser beam issuing means to said scanning means, said first length differing from said second length by a distance sufficient to cause said first laser beam to have a first focal length different from a second focal length of said second laser beam.

3. A symbol reading device as in claim 2, wherein said laser beam issuing means comprises a semiconductor laser.

4. A symbol reading device as in claim 2, wherein said scanning means comprises a polygonal mirror.

5. A symbol reading device as in claim 2, wherein said optical means comprises a half mirror for splitting said laser beam into said first and second laser beams.

6. A symbol reading device as in claim 5, wherein said first optical path leads directly from said half mirror to said scanning means.

7. A symbol reading device as in claim 5, wherein said optical means further comprises at least two reflecting mirrors for directing said second laser beam along said second optical path.

8. A symbol reading device as in claim 4, wherein said polygonal mirror has at least two reflecting faces that are inclined at different angles with respect to a longitudinal axis of said polygonal mirror for allowing a laser beam to be scanned in at least two parallel directions.

* * * * *